United States Patent [19]

Porter et al.

[11] Patent Number: 5,275,360
[45] Date of Patent: Jan. 4, 1994

[54] METHOD FOR MODIFYING AIRCRAFT STRAKE

[75] Inventors: Richard G. Porter, Burleson; Bryan J. Guzzardo, Fort Worth, both of Tex.

[73] Assignee: Lockheed Corporation, Fort Worth, Tex.

[21] Appl. No.: 979,178

[22] Filed: Nov. 20, 1992

[51] Int. Cl.$^5$ .............................. B64C 1/00
[52] U.S. Cl. ........................ 244/119; 244/117 R
[58] Field of Search ............................ 244/15, 45

[56] References Cited

U.S. PATENT DOCUMENTS

| | | | |
|---|---|---|---|
| 4,050,651 | 9/1977 | Neal et al. | 244/200 X |
| 4,198,018 | 4/1980 | Brault | 244/119 |
| 4,311,289 | 1/1982 | Finch | 244/198 X |
| 4,378,992 | 4/1983 | Pierce | 244/199 |
| 4,466,586 | 8/1984 | Burnham | 244/75 R |
| 4,569,494 | 2/1986 | Sakata | 244/199 |
| 4,858,853 | 8/1989 | Westerman et al. | 244/119 |
| 4,869,443 | 9/1989 | Skow | 244/119 |

Primary Examiner—Margaret A. Focarino
Assistant Examiner—Christopher P. Ellis
Attorney, Agent, or Firm—James E. Bradley

[57] ABSTRACT

A method for reducing the length of the forebody strakes along a fighter airplane involves modifying the outer contours of intermediate frame members. The original skin panels are removed. A strake contour portion on each intermediate frame member is then cut away. A replacement outer support will be secured to each intermediate frame member to fill the gap left by the cutting away of the strake contour portion. The replacement outer edge support is secured by fasteners and new skin panels then secured in place.

15 Claims, 7 Drawing Sheets

METHOD FOR MODIFYING AIRCRAFT STRAKE

BACKGROUND OF THE INVENTION

1. Field of the invention

This invention relates in general to modifications of an airplane fuselage, and in particular to a method for shortening the forward portion of strakes on the forebody of an aircraft.

2. Description of the Prior Art

At times, it is desirable to modify the aerodynamic features of existing aircraft. For example, tests have determined that aerodynamic performance of an F-16 fighter aircraft may be improved by modifying the fuselage. This modification involves shortening the length of the strakes on both sides of the fuselage. The strakes are thin, narrow aerodynamic shapes that extend forward from the wings on each side of the forebody.

In the portion where the strakes would be removed, a number of intermediate frame members locate between two bulkheads. The frame members comprise curved beams in symmetrical pairs, each beam having inner and outer flanges separated by a web. The outer edge contour of each frame member is formed to provide support for the existing strake. The existing F-16 aircraft has aluminum skin panels that secure over the frame members and are contoured to provide the surface of the strake.

U.S. Pat. No. 4,869,443, Sep. 26, 1989, Andrew M. Skow, describes a method of modifying the F-16 fuselage to shorten the lengths of the strakes. The method of the patent teaches to extensively disassemble the existing structure around the crew station and install new parts, including new frame members. The method requires removing all of the intermediate frame members between the two bulkheads, intercostals, and other related attachments of crew station equipment and system supports. New frame members without the strake contour on the outer edges are then installed.

The complete removal of the intermediate frame members between the crew station forward and rearward bulkheads is particularly disruptive. The intermediate frame members provide support for numerous crew station equipment and system supports. Supports for throttle quadrant and cable mounts, electrical wiring harnesses, hydraulic and pneumatic tubing, environmental control systems routing, and flight control consoles are some of the attachments made to these intermediate frame members. The systems hardware must be detached prior to removing the intermediate frame members. Additional crew station equipment and systems, also unrelated to the original purpose of the retrofit, must be removed to provide adequate access to associated frame joints and system supports. During reconstruction, complex tooling is required to locate new frame members to re-establish aircraft contours within tolerances. Supplemental tooling is required to relocate system supports and equipment that was removed earlier. Further, many of these attachments must be electrically grounded for safety purposes, requiring extra testing equipment and skilled technicians to accomplish the task.

SUMMARY OF THE INVENTION

In this invention, the aircraft fuselage is modified to remove a forward portion of each strake without removing the intermediate frame members. The original skin panels are removed. Then, the strake contour portion of the outer flange and web of each of the intermediate frame members are cut away while the intermediate frame members are still in place on the aircraft. This leaves a gap in the outer flange of each of the intermediate frame members.

A replacement outer edge support is provided for the gap of each of the intermediate frame members. A guide tool clamps to the intermediate frame member to locate the desired position of the replacement outer edge support. The outer edge supports are then secured to each of the intermediate frame members to provide the desired contour. New skin panels, without the strake contour, are then placed over the intermediate frame members.

DETAILED DESCRIPTION OF THE INVENTION

Figure 1:
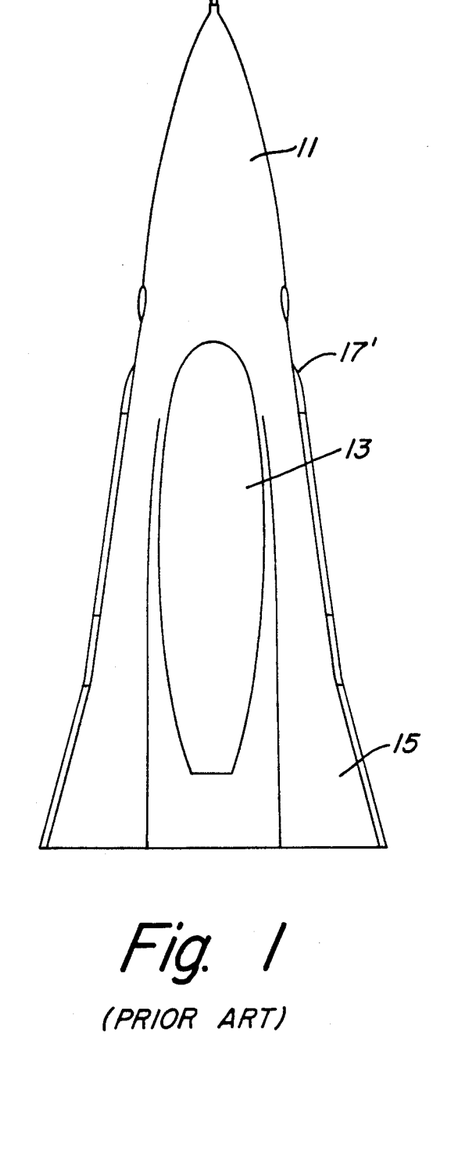
FIG. 1 is a simplified plan view of an F-16 forward fuselage prior to modifying the forebody strakes.
Figure 2:
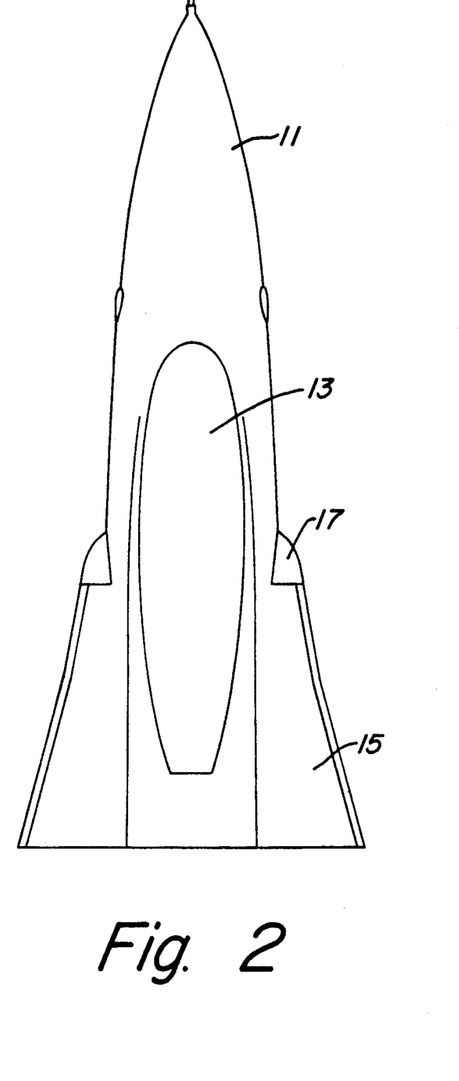
FIG. 2 is a simplified plan view of an F-16 forward fuselage with forebody strakes after being modified in accordance with this invention.

Referring to FIGS. 1 and 2, FIG. 1 illustrates airplane 11 before modification, and FIG. 2 illustrates airplane 11 after modification. Airplane 11 has a crew station or cockpit 13. Strakes 15 extend along both sides of the forebody. Strakes 15 comprise thin, narrow forward extensions of the wings (not shown). In the prior art, as illustrated in FIG. 1, each strake 15 had a forward end 17' that located substantially at the forward end of cockpit 13. After modification, forward end 17 locates approximately the central portion of cockpit 13, as shown in FIG. 2.

Figure 3:
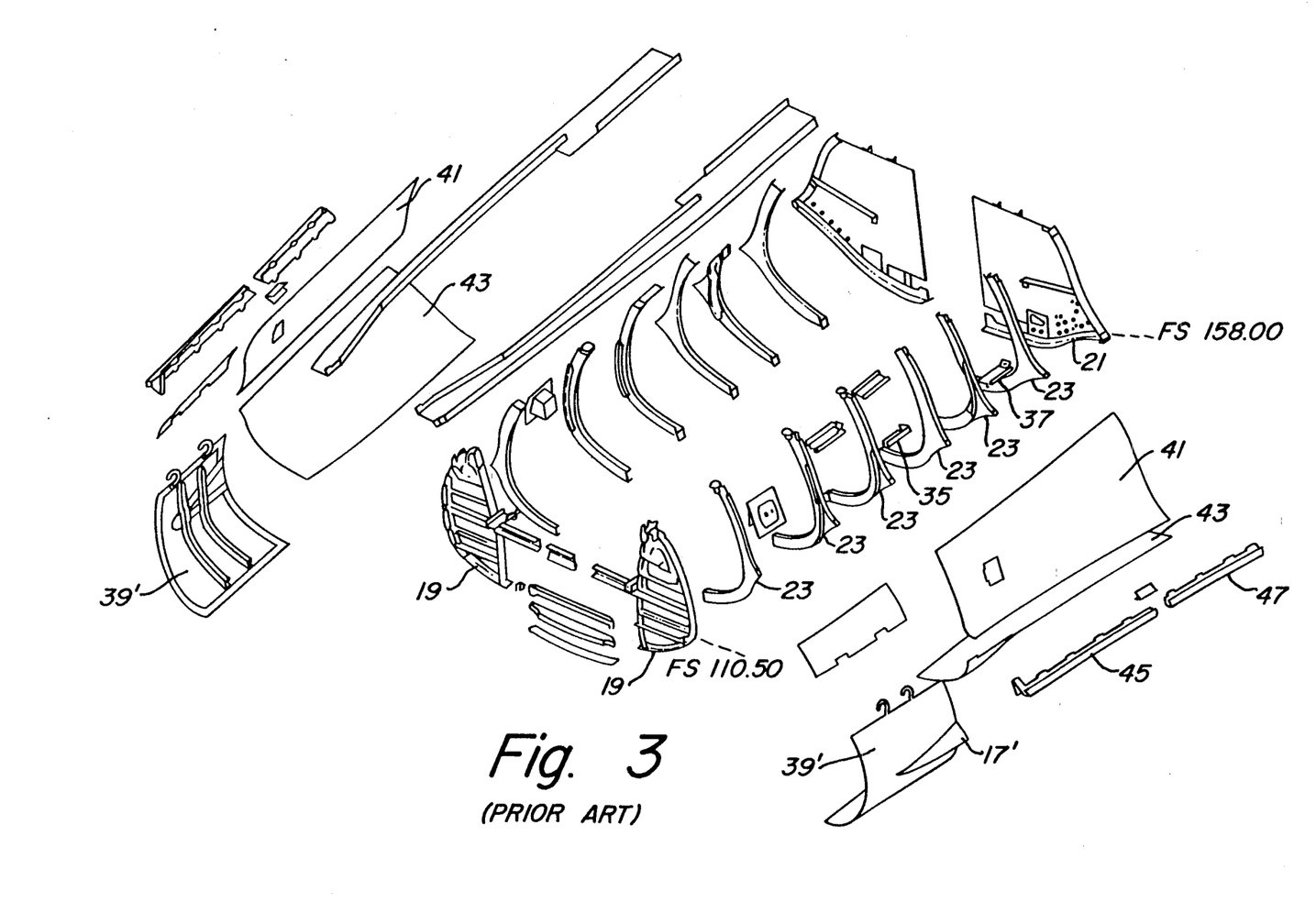
FIG. 3 is an exploded view of the structural members that define the F-16 forward fuselage, prior to modification.
Figure 11:
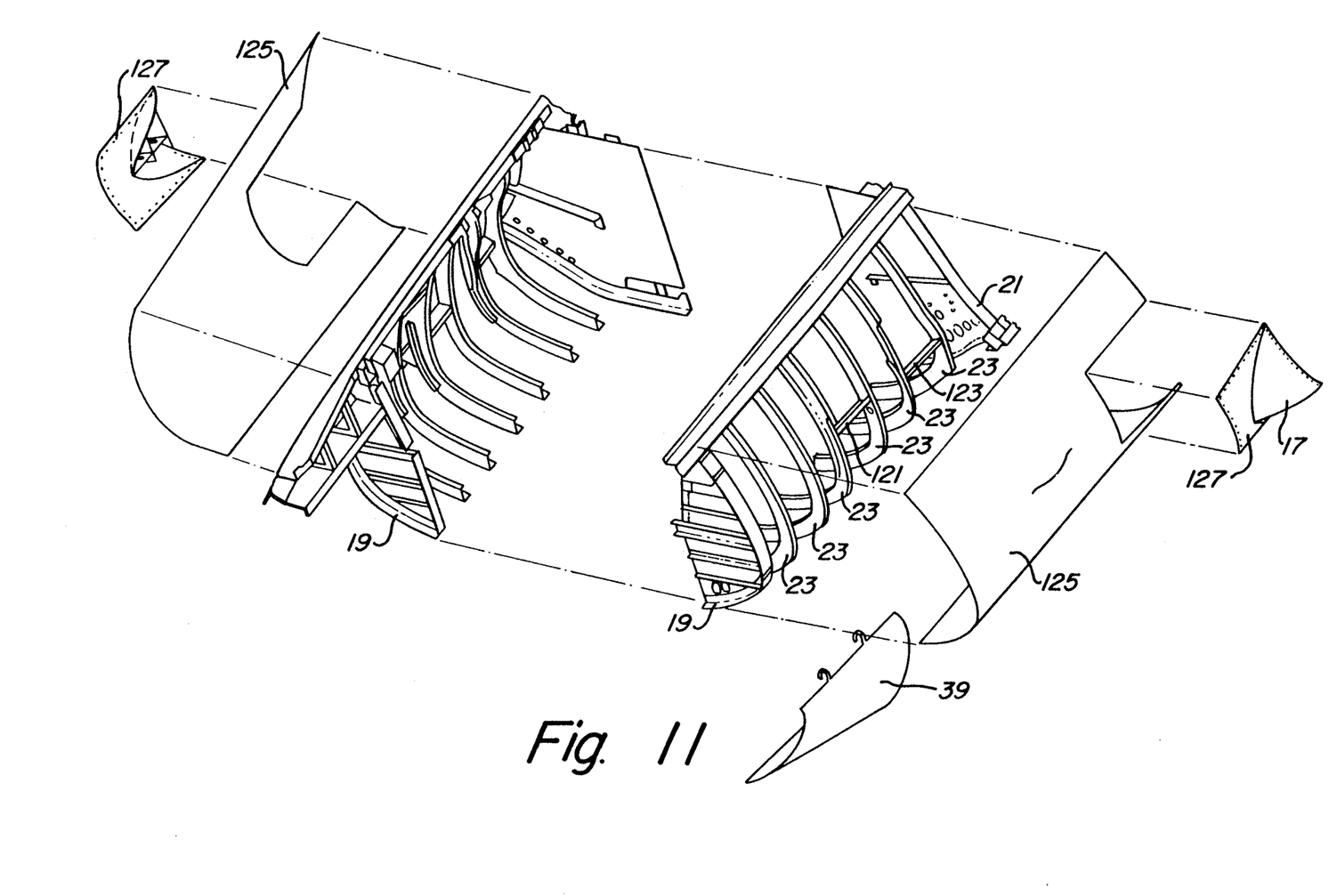
FIG. 11 is an exploded view of the structural members and skin panels of the F-16 aircraft of FIG. 2, showing the modifications in accordance with this invention.

FIG. 3 illustrates the structural members and skin panels of the forebody section prior to modification, while FIG. 11 illustrates the structural members and skin panels after modification. Referring to FIG. 3, the structural members include a forward bulkhead 19 and a rearward bulkhead 21, which are not modified in this invention. In this invention, the unmodified strake forward end 17' (FIG. 1) terminates just short of forward bulkhead 19. After modification, as illustrated in FIG. 2, strake forward end 17 locates in the vicinity of rearward bulkhead 21.

Six pairs of intermediate frame members 23 are spaced along the longitudinal axis of airplane 11 between forward bulkhead 19 and rearward bulkhead 21 also referred to in the drawing as fuselage stations FS 110.50 and FS 158.00. Intermediate frame members 23 are curved beams shaped for defining the contour of the fuselage in that area of airplane 11. Each pair differs from the other pairs. The intermediate frame members 23 within a pair are symmetrical and mirror images of each other. Intercostals 35, 37 interconnect some of the intermediate frame members 23. Intercostals 35, 37 are short longitudinally extending frame members used for supporting equipment.

An access door 39' has hinges for access and extends forward of forward bulkhead 19 on each side of aircraft 11. The prior art access door 39' has a casting on its exterior which comprises the fairing or forward end 17'. This portion of airplane 11 also originally has upper and lower skin panels 41, 43, which connect between rearward bulkhead 21 and forward bulkhead 19. Skin panels 41, 43, as well as the intermediate frame members 23 all are originally contoured to define the forward portion of strake 15 (FIG. 1). Strake edges 45, 46 are castings that fit to the junction between the upper and lower skin panels 41, 43.

In this method, the access door 39', upper and lower skin panels 41, 43, intercostals 35, 37 and strake edges 45, 47 are removed and completely replaced with new members. The intermediate frame members 23, however, remain in place and are modified.

Figure 4:
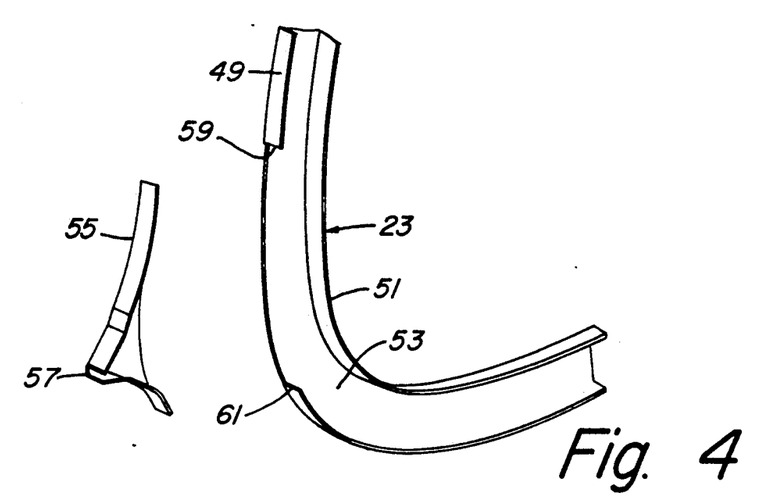
FIG. 4 is a perspective view of a portion of one of the intermediate frame members of the F-16 forward fuselage, and illustrating a strake contour that has been cut away from the intermediate frame member.

FIG. 4 illustrates a first step in the modification after the access door 39', upper and lower skin panels 41, 43 and strake edges 45, 47 (FIG. 3) have been removed. Each intermediate frame member 23 will be modified while it is still in place in the forward section of airplane 11. Each intermediate frame member 23 has an outer flange 49 on its outer side and an inner flange 51 on its inner side. A web portion 53, which is perpendicular to the longitudinal axis of the airplane, extends between the inner and outer flanges 49, 51. Flanges 49, 51 are approximately 90 degrees relative to web portion 53.

Each of the intermediate frame members 23 has a strake contour portion 55 located on the outer edge approximately halfway between the upper and lower ends. This strake contour portion 55 differs for each pair of the intermediate frame members 23, but generally is a triangular shaped portion protruding outward to form the support for the strake 15 (FIG. 1). Strake contour 55 has an outer edge 57 to which the strake edges 45, 47 attach.

In this method, strake contour portion 55 is cut away from each intermediate frame member 23. The cut will extend through the outer flange 49 as well as part of the web portion 53. This will leave a gap 59 in the outer flange, gap 59 terminating at each end in edges 61 of the outer flange 49.

Figure 5:
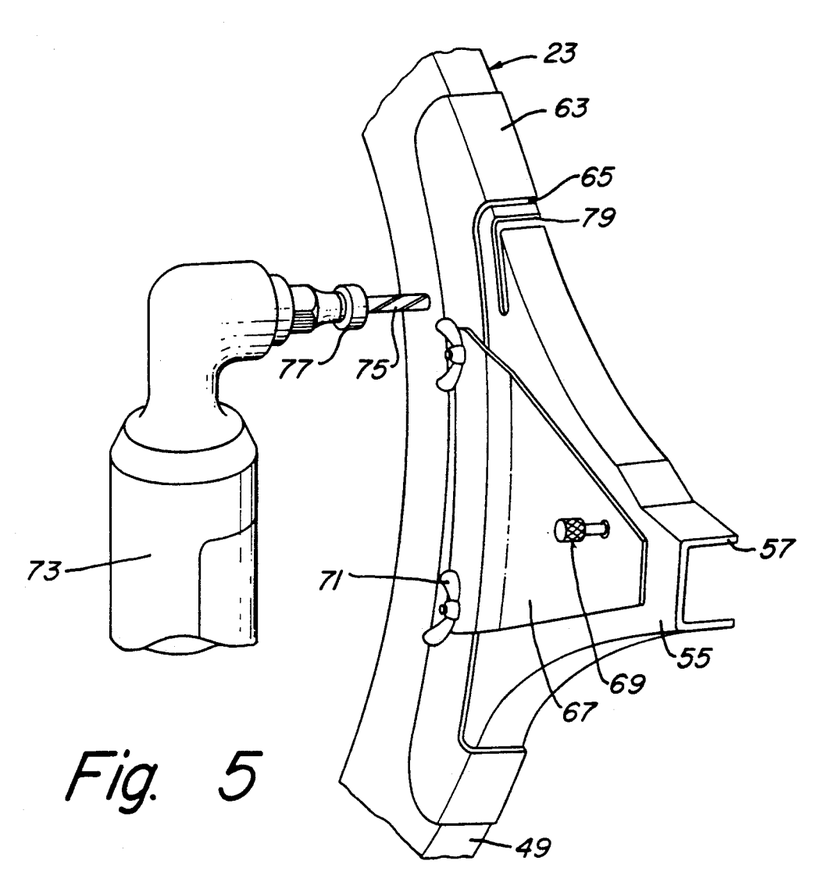
FIG. 5 illustrates one method for cutting away the strake contour from the intermediate frame member of FIG. 4.

FIG. 5 illustrates one method for cutting away strake contour portion 55. In this method, a cutting guide 63 is placed over the intermediate frame member 23. A different cutting guide 63 with a different contour will be used for each intermediate frame member 23 pair. Cutting guide 63 has a guide edge 65. A locating bracket 67 secures to a locating pin 69. Locating pin 69 secures to a hole (not shown in FIG. 5) previously installed for original tooling purposes. Wing nuts 71 connect cutting guide 63 to bracket 67. Once located, clamps (not shown) will clamp cutting guide 63 to the outer flange 49 of intermediate frame member 23. Then, wing nuts 71 will be loosened and locating bracket 67 removed.

A cutting tool such as a router 73 will then follow along cutting guide edge 65. Router 73 is conventional, having a cutting tip 75. A roller 77 mounted above cutting tip 75 will roll along guide edge 65 during the cutting procedure. The numeral 79 illustrates the cut being formed. Once the strake outer portion 55 has been cut away, the cutting guide 63 is removed.

Figure 6:
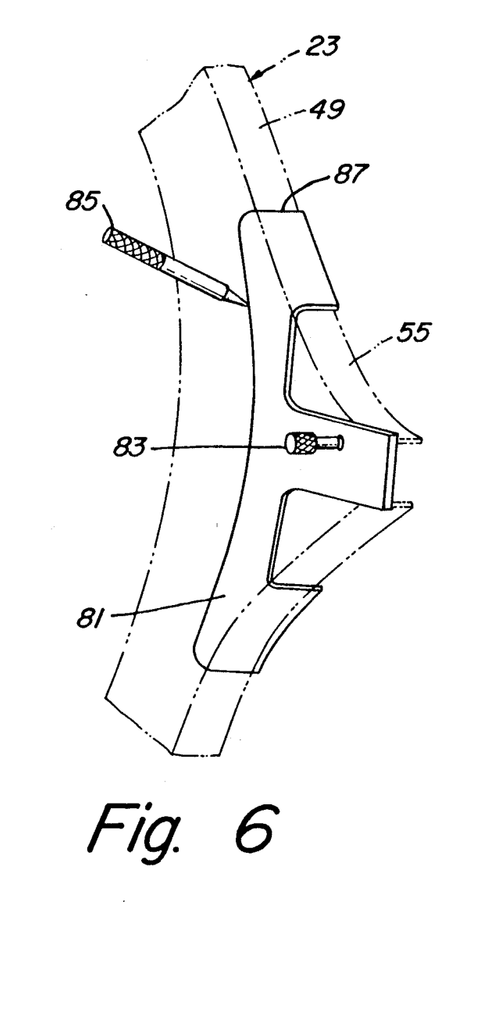
FIG. 6 illustrates a first step of an alternate method for cutting away the strake contour of the intermediate frame member of FIG. 4.
Figure 7:
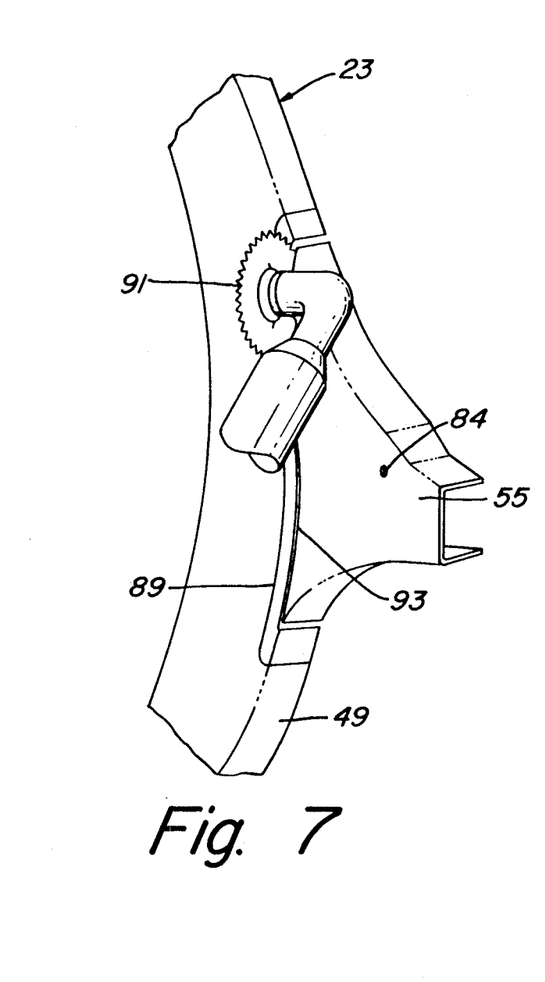
FIG. 7 illustrates a second step of an alternate method for cutting away the strake contour of the intermediate frame member of FIG. 4.
Figure 8:
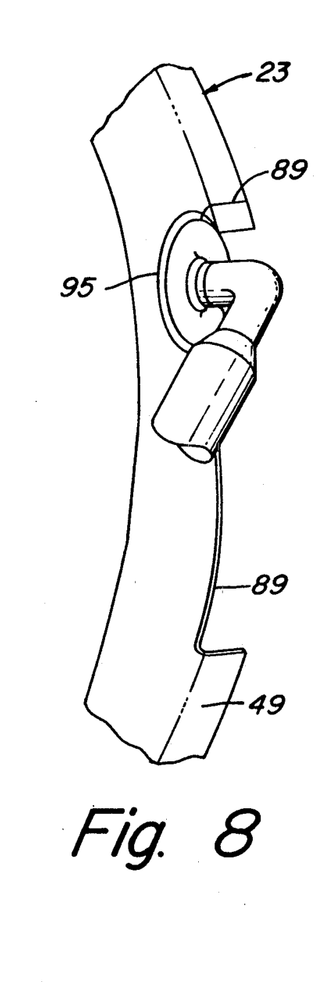
FIG. 8 discloses a third step of an alternate method of cutting away the strake contour of the intermediate frame member of FIG. 4.

FIGS. 6, 7 and 8 illustrate an alternate method for removing strake contour portions 55. In the alternate method, a scribe guide 81 will be clamped to each intermediate frame member 23. Scribe guide 81 will be positioned by a locating pin 83, which engages a tooling hole 84 (FIG. 7) originally contained in each intermediate frame member 23. Once positioned, a scribe 85 will be employed along edge 87 of scribe guide 81 to indicate where the strake contour portion 55 should be cut away.

Then, scribe guide 81 will be moved. A power handheld cutter with a rotating disk 91 will be employed to make a rough cut 93 slightly outward from scribe line 89. Then, a rotary powered sander with a disk 95 will be used by a technician to sand the rough cut 93 to the scribe line 89.

Figure 9:
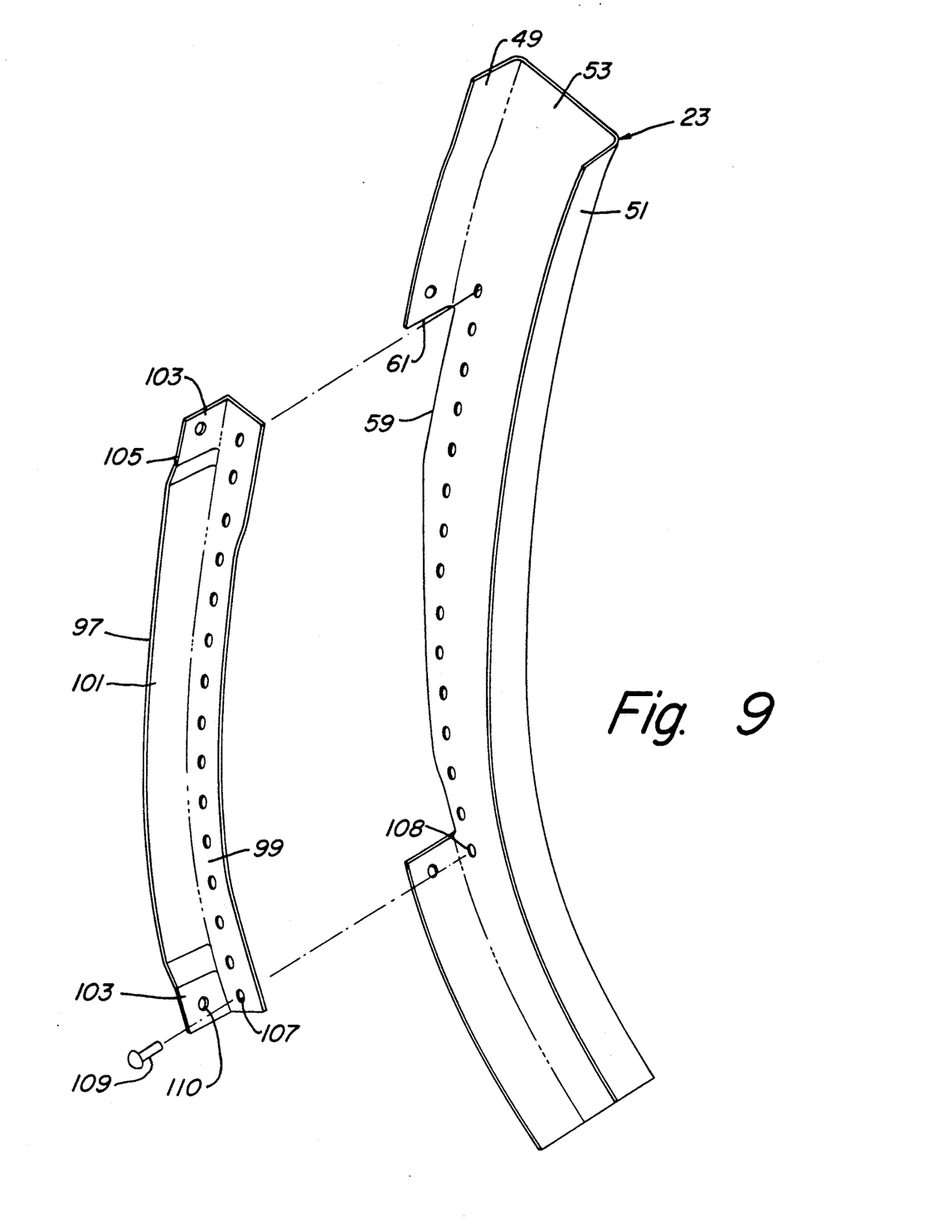
FIG. 9 is an exploded view illustrating a replacement outer edge support for installation with the intermediate frame member of FIG. 2, and shown exploded.

FIG. 9 illustrates a replacement outer edge support 97 for installation on intermediate frame member 23. A different outer edge support 97 will be formed for each intermediate frame member 23 pair. Outer edge support 97 is an L-shaped member that will continue the smooth curved contour of each intermediate frame member 23, eliminating the strake contour 55 (FIG. 4). Each outer edge support 97 has a web portion 99 that will overlay web portion 53. Each outer edge support 97 has an outer flange 101 that is approximately at a 90 degree angle relative to web portion 99.

Outer flange 101 has ends 103 that are spaced apart a greater distance than the edges 61 of gap 59. A joggle 105 is formed at each end 103. Joggle 105 is a recessed portion of outer flange 101. Joggle 105 will locate on the inner side of outer flange 49 when installed. The depth of joggle 105 is approximately the thickness of outer flange 49, so that a fairly smooth junction will be obtained between gap edge 61 and outer flange 101.

FIG. 9 illustrates a plurality of holes 107 in the web portions 99 and 53 for receiving fasteners 109, such as rivets. Also, a similar hole 110 will be formed in each joggle 105 for securing outer flange 101 to outer flange 49. Holes 110, 107, 108 are not preformed, rather are formed by drilling after outer edge support 97 is clamped in place as illustrated in FIG. 10.

Figure 10:
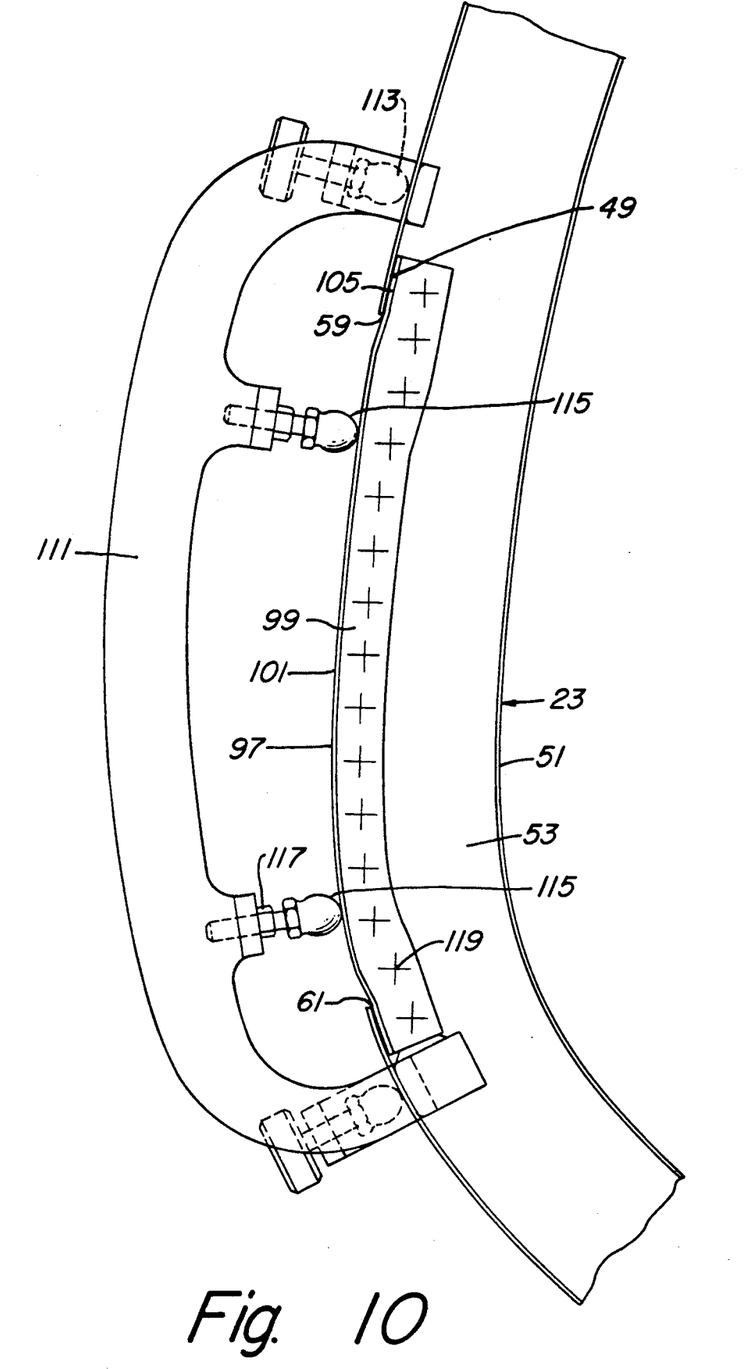
FIG. 10 illustrates a clamp and a method for installing the outer edge support illustrated in FIG. 9.

Referring to FIG. 10, a clamp tool 111 is employed to hold outer edge support 97 in the proper position prior to securing by rivets 109. Clamp tool 111 is secured to outer flange 49 by a pair of clamps 113. Clamp tool 111 is an arcuate member that will locate outward of intermediate frame member 23. Two fingers 115 protrude inward. Fingers 115 have adjusting threads 117 for locating the desired position for outer flange 49. Fingers 115 abut outer flange 101 of outer edge support 97. FIG. 10 illustrates locating centers 119 for drilling the holes 107, 108 (FIG. 9).

FIG. 11 illustrates the structure of airplane 11 after modification. Outer edge supports 97 are installed on the intermediate frame members 23. New intercostals 121, 123 locate between two of the intermediate frame members 23. A new single piece skin panel 125 replaces the skin panels 41, 43 (FIG. 3) and secures to the intermediate frame members 23 and outer edge supports 97. A new access door 39 without strake forward end 17' (FIG. 3) replaces the original access door 39'. A transition fairing panel 127 secures to rearward bulkhead 21 and the adjacent intermediate frame member 23. Panel 127 forms the fairing or forward end 17 of strake 15 (FIG. 2).

To practice the method, the technicians will remove the hinged door 39, upper and lower skin panels 41, 43 and strake outer edges 45, 47 (FIG. 3). The technicians also remove intercostals 35, 37.

Then, while the intermediate frame members 23 are still in place with much of the crew station equipment still attached, the strake contour portion 55 (FIG. 4) will be cut away from each intermediate frame member 23. It may be necessary in some cases to detach some of the crew station equipment for performing the cutaway operation. The strake contour portion 55 is cut away by using the router tips 75 and cutting guide 63 as illustrated in FIG. 5. Alternately, it is handled by using the scribe guide 81, cutter disk 91 and sander disk 95 as illustrated in FIGS. 6, 7 and 8.

Then, the operator will install a new outer edge support 97 for each of the intermediate frame members 23 as illustrated in FIG. 10. The operator utilizes clamp tool 111 to properly position the outer edge support 97. The web portion 99 will overlay the intermediate frame member web portion 53. Joggles 105 will locate on the inside of each outer flange 49. Outer edge support 97 will smoothly fill the gap 59 (FIG. 4). Once in place, the operator drills holes 107, 108 (FIG. 9) through centers 119. Rivets or other fasteners 109 are employed to secure the outer edge support 97 to the intermediate frame member 23.

The operator then secures intercostals 121, 123 as shown in FIG. 11. All crew station equipment that had to be detached from intermediate frame members 23 will be re-attached in original locations. New skin panels 125 will be attached to the intermediate frame members 23. A new access door will be used to replace access door 39' (FIG. 3). Transition panel 127 will be secured to rearward bulkhead 21 and the adjacent intermediate frame member 23.

This invention has significant advantages. By cutting away and installing an outer edge support for each intermediate frame member, the intermediate frame members can be left in place in the fuselage during the modification procedure. This greatly simplifies the procedure and the cost. Most of the equipment in the crew station area remain in place during the modification procedure. New electrical grounds are not required.

While the invention has been shown in only two of its forms, it should be apparent to those skilled in the art that it is not so limited, but is susceptible to various changes without departing from the scope of the invention.

We claim:

1. A method for reducing the lengths of forebody strakes that extend along both sides of a fuselage of an airplane, the fuselage having a plurality of intermediate frame members spaced apart from each other along a longitudinal axis of the airplane and which have outer edges with strake contour portions, a plurality of original skin panels secured to the intermediate frame members which have strake contours that fit over the strake contour portions, the method comprising:
    removing the original skin panels; then
    cutting away the strake contour portions of each of the intermediate frame members while the intermediate frame members remain in the fuselage;
    attaching a replacement outer edge support to each of the intermediate frame members to replace the strake contour portions;
    fabricating replacement skin panels which eliminate the strake contours; then
    securing the replacement skin panels to the intermediate frame members and to the replacement outer edge supports.

2. The method according to claim 1, further comprising:
    providing two of the replacement skin panels with strake forward ends protruding therefrom.

3. The method according to claim 1, wherein the step of cutting away the strake contour portions of the intermediate frame members comprises:
    attaching a guide to each of the intermediate frame members; then
    cutting along an edge of the guide.

4. The method according to claim 1, wherein the step of cutting away the strake contour portions of the intermediate frame members comprises:
    attaching a guide to each of the intermediate frame members; then
    scribing a line along an edge of the guide; then
    removing the guide and cutting along the line.

5. A method for reducing the lengths of forebody strakes that extend along both sides of a fuselage of an airplane, the fuselage having a plurality of intermediate frame members spaced apart from each other along a longitudinal axis of the airplane, each of the intermediate frame members having an outer flange and a web portion that is perpendicular to the longitudinal axis, each of the intermediate frame members having a strake contour portion which provides support for a forward portion of one of the strakes, the fuselage having a plurality of original skin panels secured to the intermediate frame members which have strake contours that fit over the strake contour portions, the method comprising:
    removing the original skin panels; then
    cutting away the strake contour portion of each of the intermediate frame members while the intermediate frame members remain in the fuselage, leaving a gap in the outer flange of each of the intermediate frame members;
    providing a replacement outer edge support for the gap of each of the intermediate frame members, and providing the outer edge support with a web portion and an outer flange which eliminate the strake contour portion;
    attaching one of the outer edge supports to each of the intermediate frame members by overlaying the web portion of each of the outer edge supports on the web portion of one of the intermediate frame members and placing the outer flange of each of the outer edge supports in one of the gaps, then placing fasteners through the overlaying web portions of the outer edge supports and web portions of the intermediate frame members;

fabricating replacement skin panels which eliminate the strake contours; then securing the replacement skin panels to the intermediate frame members and to the replacement outer edge supports; and fabricating and attaching to selected ones of the intermediate frame members two skin panels which have strake forward ends.

6. The method according to claim 5, wherein the step of cutting away the strake contour portions comprises:

attaching a guide to each of the intermediate frame members; then cutting along an edge of the guide.

7. The method according to claim 5, wherein the step of cutting away the strake contour portions comprises:

attaching a guide to each of the intermediate frame members; then scribing a line along an edge of the guide; then removing the guide and cutting along the line.

8. The method according to claim 5 wherein the step of cutting away the strake contour portions results in the outer flange having two edges, one at each end of the gap and wherein the step of providing a replacement outer edge support for each of the intermediate frame members comprises:

forming a joggle at each end of the outer flange of each of the outer edge supports; and wherein the step of attaching one of the outer edge supports to each of the intermediate frame members comprises positioning the joggles of each outer flange on inner sides of the outer flange of each of the intermediate frame members, so that the outer flange of each of the outer edge supports abuts smoothly with the edges of each of the gaps.

9. The method according to claim 5 wherein the step of attaching one of the outer edge supports to each of the intermediate frame members further comprises:

providing a guide tool which has means for attachment of the guide tool to each of the intermediate frame members and adjustable locating fingers which protrude inward to define a desired contour; then securing the guide tool to each of the intermediate frame members, and positioning the fingers at the desired contour; then abutting the outer flange of each of the outer edge supports against the inward protruding fingers to provide the desired position for the outer flange of each of the outer edge supports.

10. A method for reducing the lengths of forebody strakes that extend along both sides of a fuselage of an airplane, the fuselage having a plurality of intermediate frame members spaced apart from each other along a longitudinal axis of the airplane, each of the intermediate frame members having an outer flange and a web portion that is perpendicular to the longitudinal axis, each of the intermediate frame members having a strake contour portion which provides support for a forward portion of one of the strakes, the fuselage having a plurality of original skin panels secured to the intermediate frame members which have strake contours that fit over the strake contour portions, the method comprising:

removing the original skin panels; then cutting away the strake contour portion of the outer flange and Web portion of each of the intermediate frame members while the intermediate frame members remain in the fuselage, leaving a gap in the outer flange which has two edges;

providing a replacement outer edge support for the gap of each of the intermediate frame members, and providing the outer edge support with a web portion and an outer flange and which has two ends;

forming a joggle at each of the ends of the outer flange of each of the outer edge supports;

providing a guide tool which has means for attachment of the guide tool to each of the intermediate frame members and adjustable locating fingers which protrude inward to define a desired contour;

securing the guide tool to each of the intermediate frame members, and positioning the fingers at the desired contour;

positioning one of the outer edge supports against each of the intermediate frame members by overlaying the web portion of each of the outer edge supports on the web portion of one of the intermediate frame members, placing the outer flange of each of the outer edge supports in one of the gaps, positioning the joggles of each outer flange on inner sides of the outer flange of each of the intermediate frame members, so that the outer flange of each of the outer edge supports abuts smoothly with the edges of each of the gaps, and abutting the outer flange of each of the outer edge supports against the inward protruding fingers to provide the desired position for the outer flange of each of the outer edge supports; then placing fasteners through the overlaying web portions of the outer edge supports and web portions of the intermediate frame members;

fabricating replacement skin panels which eliminate the strake contours; then securing the replacement skin panels to the intermediate frame members and to the replacement outer edge supports; and fabricating and attaching to selected ones of the intermediate frame members two skin panels which have strake forward ends.

11. The method according to claim 10, wherein the step of cutting away the strake contour portions comprises:

attaching a guide to each of the intermediate frame members; then cutting along an edge of the guide.

12. The method according to claim 10, wherein the step of cutting away the strake contour portions comprises:

attaching a guide to each of the intermediate frame members; then scribing a line along an edge of the guide; then removing the guide and cutting along the line.

13. A modified fuselage of an airplane which has reduced length strakes extending along both sides of a forebody of a fuselage of an airplane, the fuselage having a plurality of intermediate frame members spaced apart from each other along a longitudinal axis of the airplane and which have outer edges which originally had strake contour portions, the fuselage comprising:

a cut away portion along the outer edges of each of the intermediate frame members, the cut away portion removing the original strake contour portions;

a replacement outer edge support attached to each of the intermediate frame members over the cut away portion, the replacement outer edge support having an outer contour that eliminates the strake contour portion; and a plurality of replacement skin panels secured to the intermediate frame members and to the replacement outer edge supports.

14. The fuselage according to claim 13 wherein each of the intermediate frame members has an web portion that is perpendicular to the longitudinal axis and an outer flange that is perpendicular to the web portion; and wherein each of the outer edge supports has a web portion and an outer flange.

15. A modified fuselage of an airplane which has reduced length strakes extending along both sides of a forebody of a fuselage of an airplane, the fuselage having a plurality of intermediate frame members spaced apart from each other along a longitudinal axis of the airplane, each of the intermediate frame members having a web portion that is perpendicular to the longitudinal axis and an outer flange that is perpendicular to the web portion, each of the intermediate frame members originally having a strake contour portion, the fuselage comprising:

a cut away portion along each of the outer flanges and web portions of each of the intermediate frame members, the cut away portion removing the strake contour portion and defining a gap which defines edges in the outer flange;

a replacement outer edge support having a web portion and an outer flange that is perpendicular to the web portion and which has two ends;

a joggle at each of the ends of the outer flange of each of the outer edge supports;

one of the outer edge supports being mounted to each of the intermediate frame members, with the web portion of each of the outer edge supports overlaying the web portion of one of the intermediate frame members, and the outer flange of each of the outer edge supports in one of the gaps, with the joggles of each outer flange positioned on inner sides of the outer flange of each of the intermediate frame members, so that the outer flange of each of the outer edge supports abuts smoothly with the edges of each of the gaps;

a plurality of fasteners extending through the overlaying web portions of the outer edge supports and web portions of the intermediate frame members to secured the outer edge supports to the intermediate frame members; and a plurality of replacement skin panels secured to the intermediate frame members and to the replacement
outer edge supports.

* * * * *